United States Patent Office 2,876,068
Patented Mar. 3, 1959

2,876,068
PRODUCTION OF ACTIVATED ALUMINA

Robert Tertian and Denis Papee, Paris, France, assignors to Pechiney Compagnie de Produits Chimiques et Electrometallurgiques, Paris, France, a corporation of France No Drawing. Application June 2, 1955
Serial No. 512,868

Claims priority, application France June 10, 1954

3 Claims. (Cl. 23—142)

This invention relates to the production of activated alumina and more particularly to the production of activated alumina of increased activity from alumina trihydrate obtained by precipitation from sodium aluminate in the well known Bayer process.

Activated aluminas obtained by heating and partial dehydration of commercial alumina trihydrate, including particularly the alpha alumina trihydrate of the Bayer process, contains in addition to the active transition alumina, about 30% of its weight as alpha monohydrate. The presence of the monohydrate imparts a low specific surface rating to the active product, and the removal of the monohydrate is impractical if not impossible.

Active alumina in purer form can be produced from pure, fine grade alpha alumina trihydrate obtained by precipitation from a cold solution of sodium aluminate with the aid of an alumina gel seeding, but the production by this method is more expensive than is desirable.

An object of the invention is to produce activated alumina in a substantially purer or pure form by a less expensive procedure. More specifically an object is to provide activated alumina from the alumina trihydrate obtained in the Bayer process which is at least partially free of alpha monohydrate and most desirably free of substantially all of it, thereby to provide activated aluminas of superior quality.

Another object is to produce agglomerated masses or granules of activated alumina of high adsorptive quality by an easily operated inexpensive procedure.

It has now been observed that when alumina trihydrate is heated to activate the same, the undesired monohydrate forms as the first step of the dehydration or before the surface of the crystals has changed to a sufficient degree to allow the water held in the alumina lattice to escape rapidly.

When the Bayer trihydrate is heated, the specific surface of which averages about 0.1 m.²/gm., two phenomena take place during the escape of water, alpha monohydrate forms and a slow increase in specific surface occurs. It was also observed that when this increase in specific surface reaches the critical area of 10 m.²/gm., the monohydrate ceases to form and the trihydrate remaining in the mass directly changes into active alumina having a high specific surface.

Following these observations, it has now been discovered that activated alumina of improved adsorptive qualities can be produced from the alumina trihydrate obtained in the Bayer process by first subjecting the said trihydrate to grinding and then heating the ground product under dehydration conditions adapted to effect activation. In the grinding or crushing operation the trihydrate particles must be reduced to a size as small as about 2 microns to provide an active alumina substantially free of alpha monohydrate. The most active products are obtained when the grains have been reduced to a grain of 1 to 2 microns maximum size. During the grinding the specific surface changes from 0.1 m.²/gm. to several m.²/gm. Grinds of 1 to 2 micron maximum size have a specific surface area of 2 to 3 m.²/gm. measured by the B. E. T. method (Brunaner, Emmett, Teller, J. A. C. S., vol. 60, p. 309 of 1938).

The grinding operation can be carried out by any conventional apparatus not involving excessive development of heat, and ordinary grinding, for example, in a ball mill of from 2 to 4 hours is sufficient to lead to the production of active alumina of high quality. From a product ground to this fineness, an active alumina substantially free of monohydrate can be obtained having a specific surface of about 1.4 times the surface of a product obtained by the treatment of the same hydrate which has not been crushed or ground to a small size.

Activated alumina obtained in accordance with the hereindescribed procedures are about as pure and equal in quality to those obtained from fine or pure alpha alumina trihydrate by precipitation from a cold solution of aluminate seeded by an addition of alumina gel.

The data set out in the following table illustrate the relation between the monohydrate content and the adsorptive capacity of products obtained by identical activation of different samples of ground alpha alumina trihydrate obtained in the Bayer process.

| Bayer's Alpha Al Trihydrate | Monohydrate Content After Heating for Activation, percent | Adsorption of Water Under Relative Pressure: 0.5, g./100 g. |
|---|---|---|
| Unground Industrial Product | 30 | 13.8 |
| Ground Two Hours | 15 | 16.5 |
| Ground Four Hours | 10 | 17.4 |

It is better to determine the effect of grinding by the specific surface rather than by the size of particles. The average specific surface was measured on several samples: Before grinding, it is 0.1 m.²/gr., after grinding two hours: 3 to 5 m.²/gr.; after four hours 6 to 9 m.²/gr.

In accordance with a special embodiment of the invention, agglomerated masses or granules of activated alumina are produced from the ground alpha alumina trihydrate of the Bayer process by adding thereto and mixing therewith an alumina rehydratable into beta alumina trihydrate as disclosed in French Patent 1,077,116, in a proportion of at least 15% by weight, adding water sufficient to dampen the mass, forming the mass into granules, hardening the same under mild heating, as at a temperature of from about 20° to 150° C. and then heating to an activating temperature, as from 250° to 600° C. until the dehydration and activation have taken place. During the activation the ground hydrate is wholly converted into activated alumina with the result that the product obtained has a decreased quantity of monohydrate and an increased adsorptive quality.

The alumina rehydratable into beta alumina trihydrate (rehydratable simply by contacting with cold water) may be obtained, for example by heating and removing the water from the particles of ground alumina trihydrate obtained in the Bayer process immediately after its formation, as disclosed in the U. S. application Serial No. 417,343, filed March 19, 1954, now abandoned.

Example 1

Alpha alumina trihydrate obtained in the Bayer process is ground in a ball mill until the average specific surface is in the rang of 8 to 10 m.²/gr. and then heated in accordance with conventional activation procedure to 300° C. over a period of two hours at atmospheric pressure. The activated alumina obtained is substantially free of monohydrate and accordingly is of high activity.

Example 2

Alpha alumina trihydrated obtained in the Bayer process is ground as described in Example 1 and mixed with an equal quantity of alumina rehydratable into beta aluminum trihydrate obtained as hereinbefore described and the mixture is dampened with water, formed into granules and heated at a temperature of 80° C. until the granules harden, and finally heated at a temperature of 400° C. until the agglomerated masses are dried and activated.

It should be understood that the invention is not limited to the details herein given except where criticality indicated, and that it extends to any equivalents which will occur to those skilled in the art upon consideration of the tenor of the description and the scope of the claims appended hereto.

We claim:

1. A process for obtaining activated alumina of improved activity from alpha alumina trihydrate precipitated in the Bayer process which consists essentially only in crushing the particles of said alumina trihydrate to a size below 2 microns and heating the crushed product under activating conditions until an activated product is obtained.

2. In the preparation of activated alumina from alpha alumina trihydrate particles precipated in the Bayer process involving heating to 250°–600° C. until dehydration and activation has taken place, the improvement consists essentially only in grinding the said alpha alumina trihydrate particles to a size below two microns, and increasing the specific surface area to at least three square meters per gram, and thereafter effecting said heating to dehydrate and activate the alumina.

3. In the preparation of activated alumina from alpha alumina trihydrate particles precipitated in the Bayer process involving heating to 250°–600° C. until dehydration and activation has taken place, the improvement which consists in grinding the said alpha alumina trihydrate particles to a 1 to 2 micron maximum size, after which said heating is effected to dehydrate and activate the alumina.

References Cited in the file of this patent

UNITED STATES PATENTS

| | | |
|---|---|---|
| 1,972,188 | Getzen | Sept. 4, 1934 |
| 2,499,675 | Owen | Mar. 7, 1950 |

OTHER REFERENCES

Industrial and Engineering Chemistry, "Thermal Transformation of Aluminas and Alumina Hydrates," H. C. Stumpf et all., volume 42, No. 7, July 1950, pages 1398–1403.